United States Patent [19]
Hoang

[11] Patent Number: 6,014,183
[45] Date of Patent: Jan. 11, 2000

[54] METHOD AND APPARATUS FOR DETECTING SCENE CHANGES IN A DIGITAL VIDEO STREAM

[75] Inventor: Toan Q. Hoang, Indianapolis, Ind.

[73] Assignee: Imagine Products, Inc., Carmel, Ind.

[21] Appl. No.: 08/907,343

[22] Filed: Aug. 6, 1997

[51] Int. Cl.[7] .............................. H04N 5/14; H04N 7/18
[52] U.S. Cl. .......................................... 348/702; 348/700
[58] Field of Search .................................. 348/699–702, 348/169, 135; 345/328; 382/232, 236, 190, 305, 235; H04N 5/14, 7/18

[56] References Cited

U.S. PATENT DOCUMENTS

| | | | |
|---|---|---|---|
| 5,363,139 | 11/1994 | Keith | 348/415 |
| 5,392,072 | 2/1995 | Rodriguez et al. | 348/405 |
| 5,471,239 | 11/1995 | Hill et al. | 348/155 |
| 5,557,330 | 9/1996 | Astle | 348/394 |
| 5,561,477 | 10/1996 | Polit | 348/700 |
| 5,565,920 | 10/1996 | Lee et al. | 348/398 |
| 5,642,174 | 6/1997 | Kazui et al. | 348/700 |
| 5,642,294 | 6/1997 | Taniguchi et al. | 348/700 |
| 5,767,893 | 6/1998 | Chen et al. | 348/7 |
| 5,774,593 | 6/1998 | Zick et al. | 382/236 |
| 5,802,361 | 9/1998 | Wang et al. | 395/600 |
| 5,805,733 | 9/1998 | Wang et al. | 382/232 |
| 5,805,746 | 9/1998 | Miyatake et al. | 382/236 |

Primary Examiner—Vu Le
Attorney, Agent, or Firm—Woodard, Emhardt, Naughton Moriarty & McNett

[57] ABSTRACT

The present invention relates to a device which monitors a digitized video data stream and detects when scene changes occur in the video stream. The present invention detects scene changes by comparing from frame-to-frame each of the pixel colors within the frame. When a high degree of change in pixel color from one frame to the next is detected, this is identified as a scene change. The system of the present invention does not obtain the digitized video data stream by polling a hardware analog-to-digital converter. In order to ensure that the present invention is compatible with any input video source, the present invention does not request data directly from the hardware video digitizing card. Instead, the input video may be displayed upon a computer monitor in any manner, such as by the operating system of the computer. Because the computer must keep track of what is being displayed on the computer monitor, the video data used in the present invention may be downloaded from the operating system by identifying which portion of the screen contains the video data of interest.

8 Claims, 6 Drawing Sheets

METHOD AND APPARATUS FOR DETECTING SCENE CHANGES IN A DIGITAL VIDEO STREAM

TECHNICAL FIELD OF THE INVENTION

The present invention generally relates to digital signal processing and, more particularly, to a method and apparatus for detecting scene changes in a digital video stream.

BACKGROUND OF THE INVENTION

There are many applications in which it is desirable to analyze a digital video data stream in order to identify scene changes (as used herein, the phrase "video data stream" is intended to encompass any series of digital image frames, whether they comprise a full motion video or simply a sequence of discrete "still" images). For example, it is common for video footage for a larger work to be shot in the most convenient order, rather than in the order of the final larger work. An editor then assembles various portions of the video footage into the desired sequence of the final work. Similarly, a news reporting video may be pieced together from many video segments recorded at different times and places. In such situations, it is convenient to identify what scenes are contained in each piece of video footage (which may be sorted on separate video cassettes, for example) so that the appropriate scene may be readily located by the editor when it is needed in the editing process.

Because such video information may be easily digitized into a digital video data stream, it is known in the prior art to analyze the video data stream frame by frame (usually using computer software) in order to determine the boundaries of individual scenes. The software program performing this analysis must therefore be configured to interface with the video digitizing hardware in order to request input of each frame in the video data stream. Because of this direct connection to the digitizing hardware, such software can realistically work with only a limited number of hardware configurations (usually one or two). If the user desires to use a new hardware configuration, new scene detection software must be purchased or written.

Such intimate association between the scene detection software and the video input hardware severely limits the usefulness of the software and greatly increases its price. There is therefore a need for a method and apparatus for detecting scene changes in a digital video stream which overcomes this problem. The present invention is directed toward meeting this need.

SUMMARY OF THE INVENTION

The present invention relates to a device (such as a software program or a hard-wired digital device) which monitors a digitized video data stream and detects when scene changes occur in the video stream. For instance, when a video camera is aimed at a first scene for a period of time, and then the camera switches to either a different scene or the same scene viewed from a different angle, then the present invention will detect the scene change. Once a scene change is detected, the present invention catalogs the scene change and then also saves a representative frame from the prior scene which is used to identify that scene.

The present invention detects scene changes by comparing from frame-to-frame each of the pixel colors within the frame. When a high degree of change in pixel color from one frame to the next is detected (a threshold for determining "high degree of change" can be set by the user), this is identified as a scene change. The timecode (frame number) corresponding to the start and end of the scene is marked and a representative frame from the scene is saved. In order to make the pixel color determination from frame-to-frame, a value from 0 to 255 is assigned to each pixel color (for 256 color resolution systems, for example). The pixel color numbers for every pixel in the frame may also then be compared in various ways from frame-to-frame. For example, the color numbers for all pixels in the frame may be added together in order to yield a total number, and this total number may be compared to the similar value for adjacent frames. Once the difference exceeds a user-defined threshold, a scene change is identified.

The system of the present invention does not obtain the digitized video data stream by polling a hardware analog-to-digital converter. In order to ensure that the present invention is compatible with any input video source, the present invention does not request data directly from the hardware video digitizing card. Instead, the input video may be displayed upon a computer monitor in any manner, such as by a third party software controller or by the operating system of the computer. The present invention then retrieves each frame of video data from the monitor screen display data maintained by the operating system of the computer. Because the computer must keep track of what is being displayed on the computer monitor, the video data used in the present invention may be downloaded from the operating system by identifying which portion of the screen contains the video data of interest.

This approach ensures that the present invention operates completely independently of the video source and the method by which the video is input to the computer. Consequently, the present invention will work with any hardware configuration which allows video to be displayed upon the monitor of the computer.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention overcomes the limitations of the prior art devices by divorcing the scene detection process from the physical hardware configuration used to create the series of images (either full motion video or a series of discreet still pictures). As described in greater detail hereinbelow, the scene detection device does not retrieve the digital video information upon which it operates directly from the hardware which creates this digitized information (such as a video input digitizing card in a personal computer). Instead, the scene detection device of the present invention can operate upon video data displayed upon the monitor of a computer (such as a personal computer) from any source. Because the scene detection device of the present invention does not communicate directly with the source of the digital video data, it is therefore compatible with any such source. The only requirement for operation of the scene detection device of the present invention is that the video data be displayed upon a computer monitor. The scene detection device will then operate on video pixel data obtained from the computer displaying the video upon its monitor. Several hardware configuration examples are presented herein in order to illustrate the flexibility of the scene detection device of the present invention, however these illustrations are intended to be merely illustrative, as there are innumerable other hardware configurations in which the present invention may be utilized.

Figure 1:
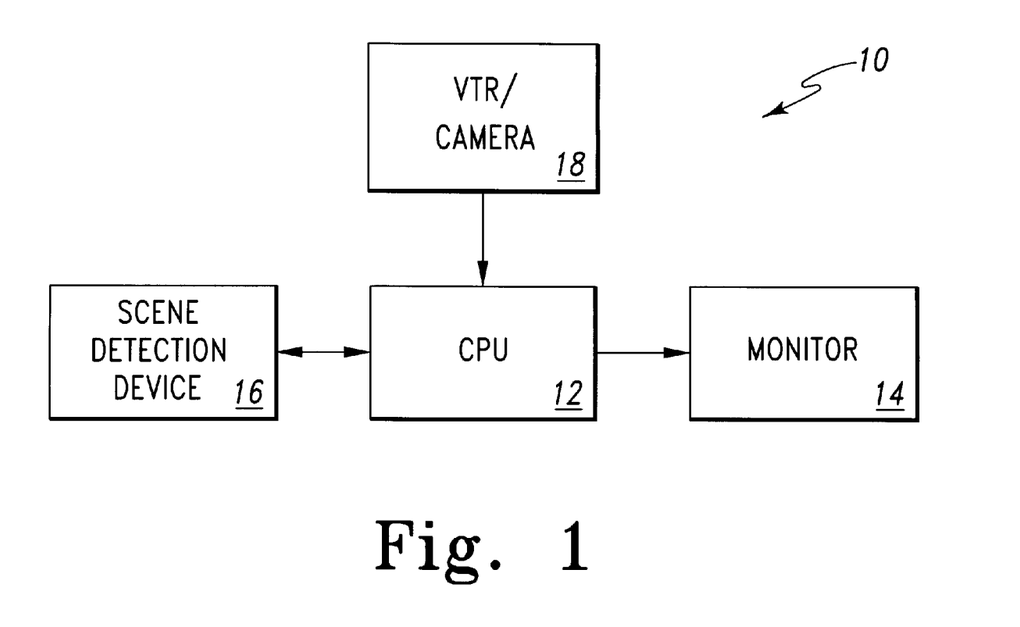
FIG. 1 is a schematic block diagram of a first example hardware configuration compatible with the present invention.

Referring to FIG. 1, there is illustrated a first hardware configuration, indicated generally at 10. The hardware configuration 10 includes a central processing unit (CPU) 12 which has an attached monitor 14 for displaying the output of the CPU 12. The scene detection device 16 of the present invention is coupled for two-way communication to the CPU 12, and in a preferred embodiment comprises a software program executed by the CPU 12. Those having ordinary skill in the art will recognize that the hardware configuration 10 will have other standard support devices that are not specifically illustrated, such as internal and external memory devices, input devices such as the keyboard and/or a mouse, etc. Video information may be supplied to the CPU 12 from a videotape recorder (VTR) or video camera 18. The output from the VTR/camera 18 may be a digital video signal or, alternatively, the output from the VTR/camera 18 may be an analog signal that is digitized by a video input digitizer circuit (not shown) associated with the CPU 12. The CPU 12 may be directed (by its operating system software or by an application software program) to display the video information received from the VTR/camera 18 upon the monitor 14. The scene detection device 16 of the present invention will then retrieve the video data required for its scene detection processing from the video information displayed upon the monitor 14, rather than directly from the VTR/camera 18 or any video input digitizer circuit.

Detecting scene changes in the video information supplied by the VTR/camera 18 can be useful in a variety of situations. For example, the VTR/camera 18 may be a security camera, such as at an automated teller machine (ATM). If the security camera 18 runs continuously, storing the output from the camera 18 would require large amounts of memory. However, the scene detection device 16 may be utilized to save only one representative frame from the output of the camera 18 each time the scene changes in the output of the camera 18. Such a scene change ill this situation would only occur when something moved into the field of view of the security camera, such as a customer.

In another application, the camera 18 may be used as part of the quality control system of a manufacturing assembly line. The camera 18 will be used to record a still photograph of each assembled part as it comes off of the assembly line. The scene detection device 16 may be used to analyze this information, looking for differences in the series of still photographs. Because each photograph is of a different item, but all items are supposed to be identical, detecting a scene change may be used to indicate a manufacturing defect.

Furthermore, the scene detection device 16 may be used to examine video input from a VTR 18 that is displaying stock movie footage. In this way, the scene detection device 16 may log the scene changes in such stock footage in order to make a graphic index of the scenes contained on each storage videotape.

As a final example, the hardware configuration 10 of FIG. 1 play be used in the process of shortening the running time of old television shows which are being prepared for rebroadcast.

Many times, such television shows originally contained less commercial slots then present day television shows, therefore the total running time of each episode is to long for the allocated time slot for rebroadcast. It is therefore necessary to remove some of the non-essential footage from each television show in order to shorten its total length. The scene detection device 16 can be used to identify each discreet scene within the television show in order to assist an editor in locating material which can be excised from the television show without destroying the continuity of the show.

Figure 2:
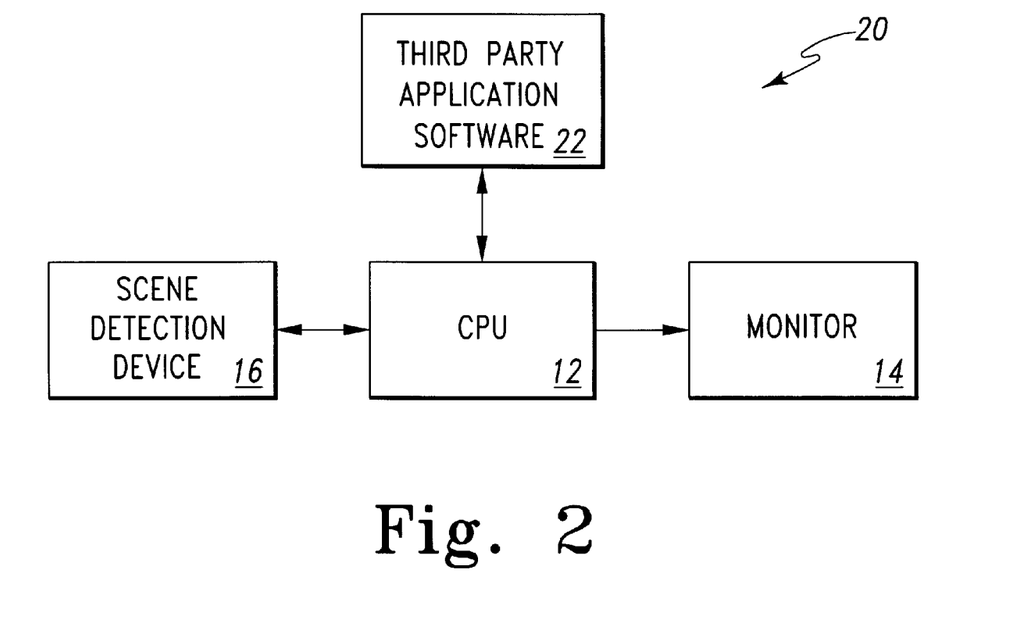
FIG. 2 is a schematic block diagram of a second example hardware configuration compatible with the present invention.

A second hardware configuration example is illustrated in FIG. 2 and indicated generally at 20. The hardware configuration 20 includes the same CPU 12, monitor 14 and scene detection device 16 of the hardware configuration 10, however the video input to the CPU 12 is provided by a "third party" software application program 22. Such third party software 22 might include, for example, an MPEG decoder/player which is capable of creating a digitized video stream from compressed digital storage files (such as on a compact disc (CD) or from a computer hard disk memory file). Another example of third party software 22 which may be used to create a stream of video data is an internet browser software application which could produce a series of still images in which it may be desirable to detect changes from image to image. The scene detection device 16 may be used to detect scene changes in any such video input provided by the third party software 22, no matter what software 22 is utilized. This is because the scene detection device 16 does not interact directly with the third party software 22. As long as the third party software 22 is operative to display video information upon the monitor 14, through the CPU 12, the scene detection device 16 will be able to analyze the video data and detect scene changes therein (it will be appreciated by those skilled in the art that the present invention does not require the video data to be actually displayed on the montor 14; the scene detection device 16 will operate even if the monitor 14 is not connected to the CPU 12).

Figure 3:
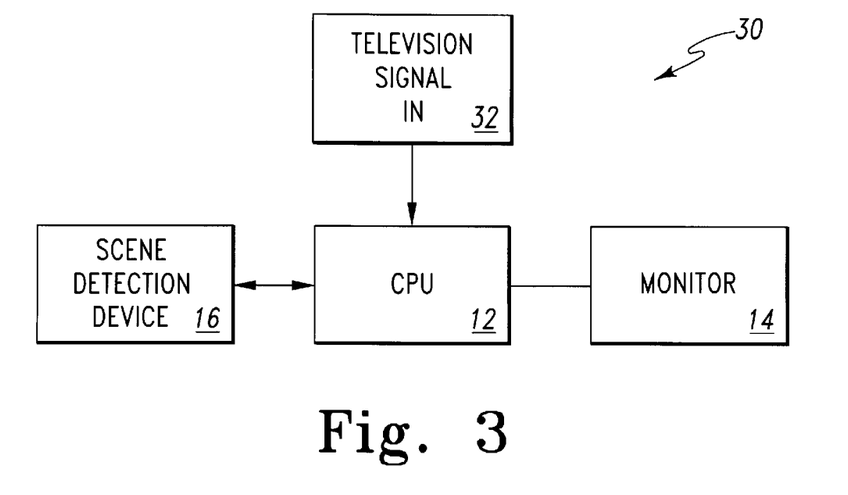
FIG. 3 is a schematic block diagram of a third example hardware configuration compatible with the present invention.

Referring now to FIG. 3, there is illustrated a third example hardware configuration, indicated generally at 30. In the configuration 30, the video signal supplied to the CPU 12 is a standard television input signal 32, such as from a cable television coaxial connection or from a television antenna. Once this television input signal 32 is applied to the CPU 12, it may be displayed upon the monitor 14 via a hardware tuner associated with the CPU 12 and within the computer, or it may be digitized and decoded by the CPU 12 operating system (such as WINDOWS 97 operating system manufactured by Microsoft Corporation). Once again, because there is no connection between the scene detection device 16 and the input television signal 32, the scene detection device 16 need not be customized to accept such input. Because the CPU 12 is able to display the video signal upon a monitor, the scene detection device 16 may be used to operate upon this video information.

Figure 4:
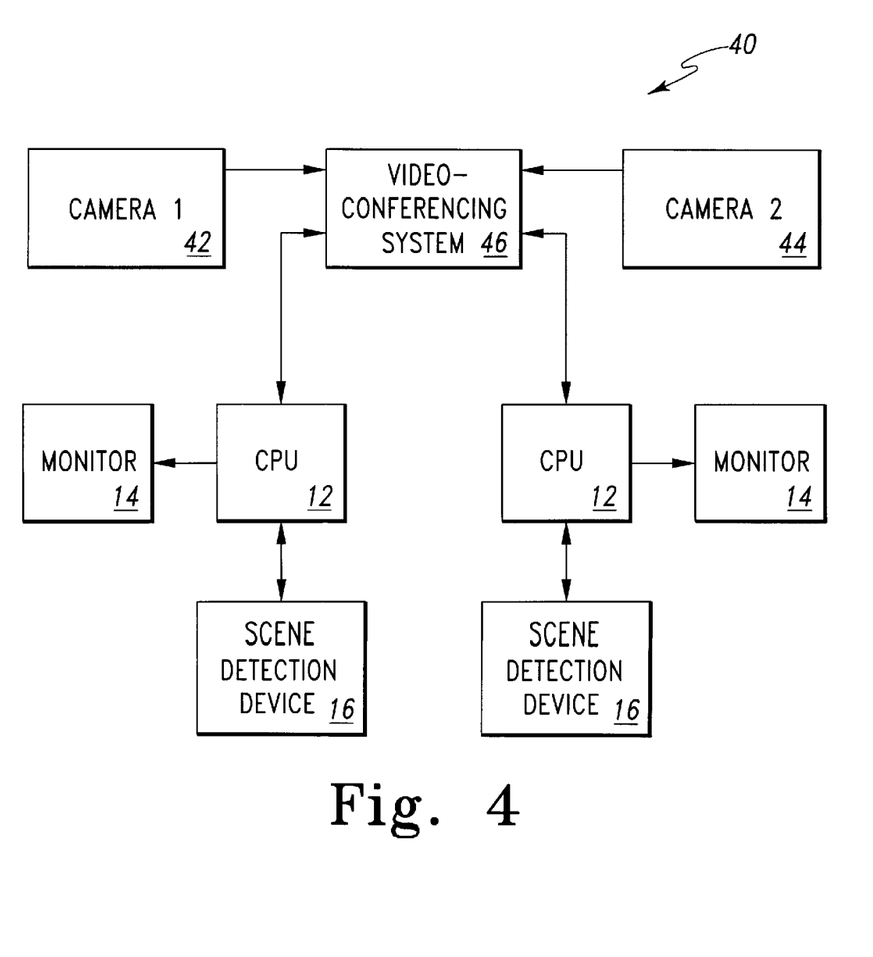
FIG. 4 is a schematic block diagram of a fourth example hardware configuration compatible with the present invention.

A fourth example of a hardware configuration in which the scene detection device of the present invention may be incorporated is illustrated in FIG. 4 and indicated generally at 40. The hardware configuration 40 is a remote teleconferencing system in which two remote modes are illustrated, it being understood that a virtually unlimited number of nodes may be added to the system 40. A first camera 42 is used to capture video information at a first location, while a second camera 44 is used to capture video information at a second, remote location. The outputs from the cameras 42 and 44 are coupled to a centralized video conferencing system 46, which is in turn coupled to remote computer stations, each containing a CPU 12, a monitor 14 and a scene detection device 16. In such a configuration, the scene detection device 16 may be used to create a record of the video conference by identifying scene changes in the video data stream and saving one frame from each scene in order to compile a relatively compact record of the video conferencing session.

Figure 5:
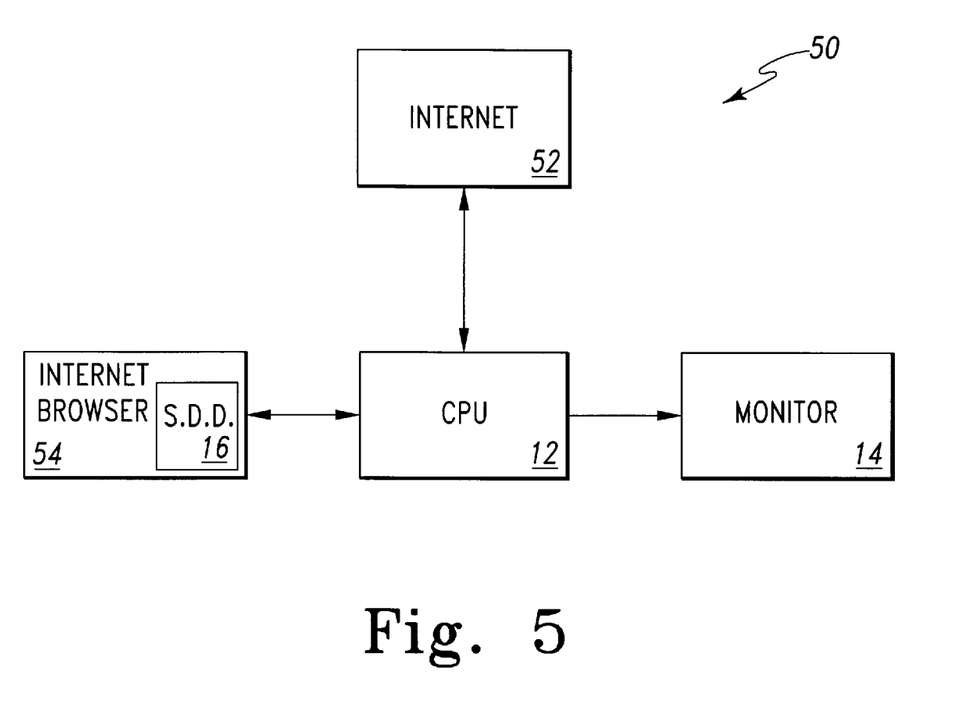
FIG. 5 is a schematic block diagram of a fifth example hardware configuration compatible with the present invention.

As a final example, FIG. 5 illustrates a fifth hardware configuration, indicated generally at 50. In the configuration 50, the CPU 12 is coupled to the internet 52 for two way communication with other computers. The CPU 12 operates internet browser software 54 which is operative to automatically access various internet 52 sites on a periodic basis. The internet browser software 54 includes the scene detection device 16 as a plug-in software module. In this configuration, the internet browser software 54 is operative to periodically sample particular web pages and the scene detection device software 16 may be used to detect and record changes in the web page. This may be useful to the user of the internet browser software 54, as the user is only required to review the web page after the scene detection device software 16 has determined that the web page has changed.

From the above enumerated examples, it should be apparent to those having ordinary skill in the art that there are many hardware configurations in which it would be useful to perform a scene detection operation. The examples listed above are only a few of the innumerable applications for such scene detection functionality. Because the source of the video data in each of the above examples originates from a different hardware device, use of a prior art scene detection device in any of the exemplary hardware configurations would require that the scene detection device be specifically designed to interface with the source of video data. In other words, the scene detection device would( be limited to working with the one or two video input devices for which it was designed. Such a scene detection device could not be used in an alternate hardware configuration unless the device were modified to interface with the new source of video data. As detailed hereinbelow, the scene detection device 16 of the present invention does not exhibit any such limitations in the source of the video data. The scene detection device 16 of the present invention may be used with any video source which displays the video data upon the monitor 14 of the CPU 12.

In a preferred embodiment of the present invention, the scene detection device 16 is implemented as a software application program executed by the CPU 12, wherein the software program is operative to convert the input video data stream into a sequence of individual frames and associated data, each such frame being associated with one scene in the incoming data stream. The scene detection device of the present invention therefore creates a data file which contains information that will identify the beginning and end of each scene of the video data stream, and which contains a recorded frame from each such scene. Such recorded frames may be the first frame from the scene, the most representative frame from the scene, etc, depending upon options selected by the user.

Figure 6A:
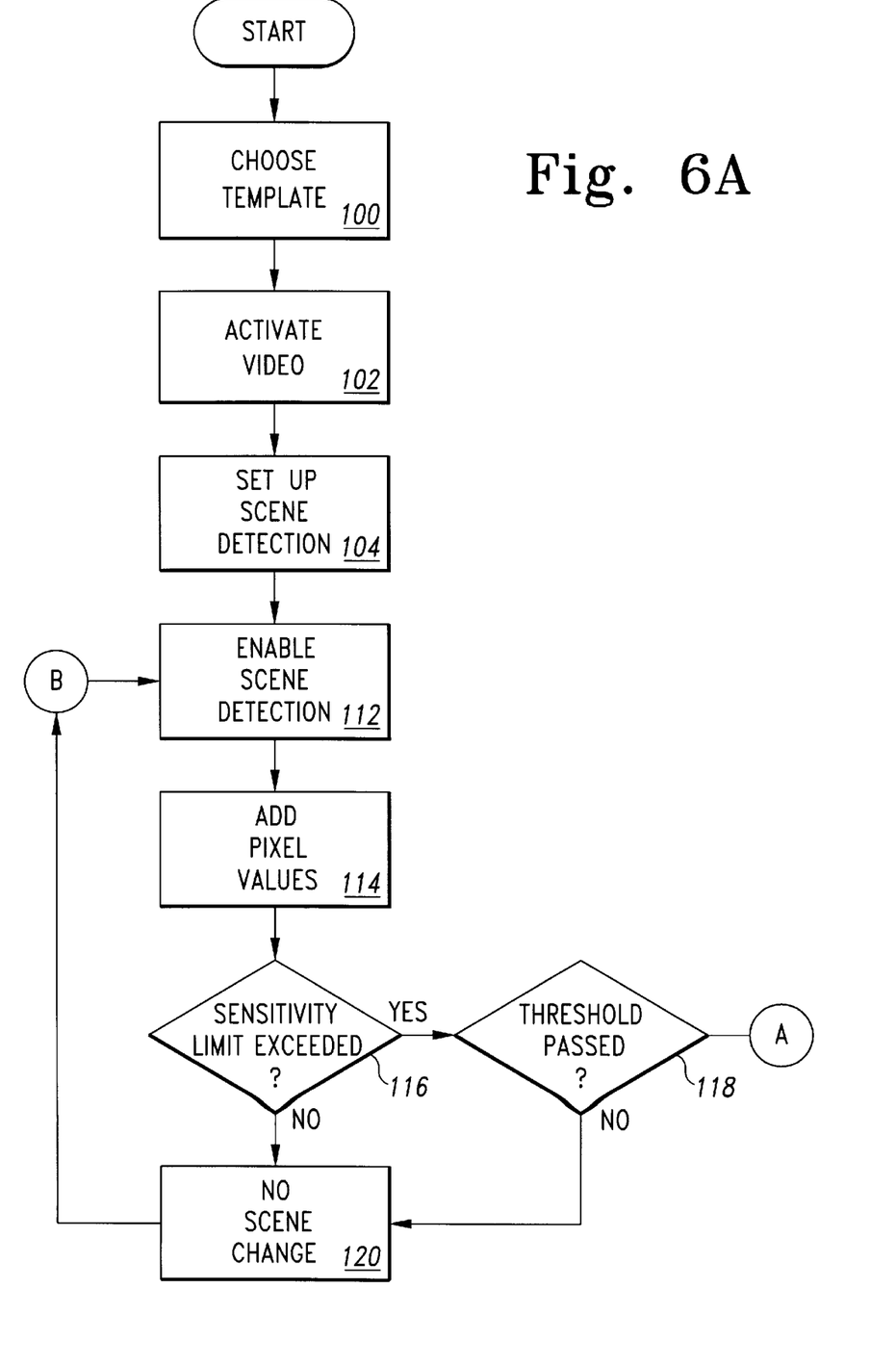
FIGS. 6A–B is a schematic process flow diagram of a preferred embodiment scene detection process of the present invention.
Figure 6B:
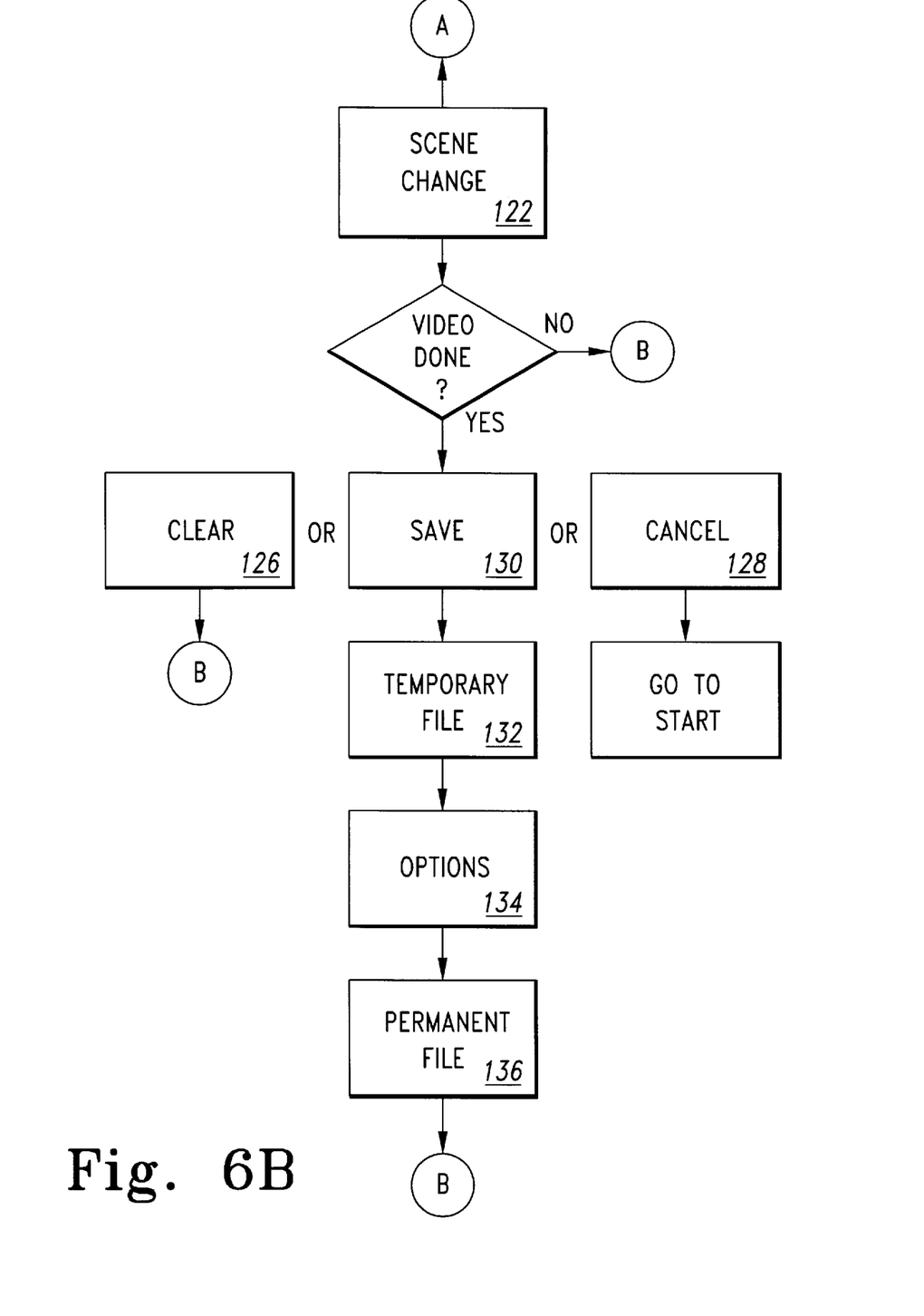

Referring now to FIGS. 6A–B, there is illustrated a schematic process flow diagram illustrating the process executed by the scene detection device of the present invention in determining the boundaries between scenes in a digital video data stream. The process of FIGS. 6A–B is implemented in the preferred embodiment of the present invention as a software routine to be executed by the CPU, however, those having ordinary skill in the art will readily recognize that the process of FIGS. 6A–B could just as readily be implemented in hard-wired digital circuitry. The preferred embodiment software begins at step 100 in which the user is prompted to choose a data template from one of several previously created templates or to create a new template of the user's design. The template is used to organize data on the monitor screen 14, in any printout generated by the program, and in the file output of the program (if the user chooses to save data created by the program). A typical template might include an area for displaying the frame which the software has associated with the detected scene, fields to be filled in by the user which will allow the user to enter information pertaining to each scene, as well as fields to be filled in by the software program automatically, such as timecode in and timecode out for each scene, pixel data for the most representative frame from the scene, etc.

The preferred embodiment of the software program of the present invention which executes the process of FIGS. 6A–B operates under the WINDOWS operating system manufactured by Microsoft Corporation. At step 102, the program therefore activates the VIDEO FOR WINDOWS application which is part of the Microsoft WINDOWS operating system. This causes the CPU 12 operating system to initialize the hardware video digitizing card associated with the CPU 12, thereby enabling the operating system to receive the input video data stream and display it upon the monitor 14. Those having ordinary skill in the art will recognize that the present invention does not require the use of the WINDOWS operating system, and any computing platform may be used which allows input and display of video data. Activation of VIDEO FOR WINDOWS allows the user to adjust various video parameters, such as color, contrast, brightness, saturation, etc. Video resolution and bit depth may also be adjusted. This determines the number of pixels to be displayed and the number of colors available for each pixel, which in turn effects the file size for any video frames stored by the software program. Because the operating system of the CPU 12 is responsible for receiving the input digital video data and displaying this data upon the monitor 14, the software program operating the process of FIGS. 6A–B is completely divorced from any of the video digitizing hardware. This offers the unique advantage that the software program of the present invention may be used unmodified with any hardware digitizing configuration.

Step 102 further allows the user to choose between serial control of the video (e.g. user has control over starting and stopping of the data stream), use of timecode feed (e.g. the software knows the frame number of each frame, but can't control the video transport), or time of day feed (e.g. the software is analyzing a live sporting event feed, etc. and the time of day is associated with each frame rather than a timecode (duration since beginning of tape)).

As an option to activating a video control portion of the CPU 12 operating system, the software program of the present invention may instead activate a third party software application which is being concurrently executed by the CPU 12 operating system. This third party software application will then be responsible for controlling input and display of the digital video stream. An example of such third party software applications include an MPEG video player, a QUICKTIME movie player, etc.

At step 104, the program allows the user to set certain parameters in the scene detection process. These parameters are preferably displayed with default settings and the user is given an opportunity to deviate from the default settings. For example, the user may be asked to determine which video frame is going to be saved by the program of the present invention in relation to each detected scene. For example, the program might grab the head (first) frame in the new scene to be saved with the timecode in and timecode out information for the scene for later reference. Alternatively, the program might grab the most representative frame of the scene to be stored For purposes of the present discussion, the most representative frame is preferably the frame with the lowest degree of change from its neighboring frames.

A user may also instruct the program as to when to stop the scene detection process. As the program goes through the scene detection process, it will detect scene boundaries and save one frame associated with each scene. Because it is impossible to know beforehand how many scenes will be detected by the scene detection software, the user is unable to determine how much memory will be required to save all of this information. Therefore, the user may instruct the software in advance to stop the process when the hard drive has a predetermined amount of storage space left, when the total size of the files created by the software reaches a predetermined limit, etc.

Figure 7:
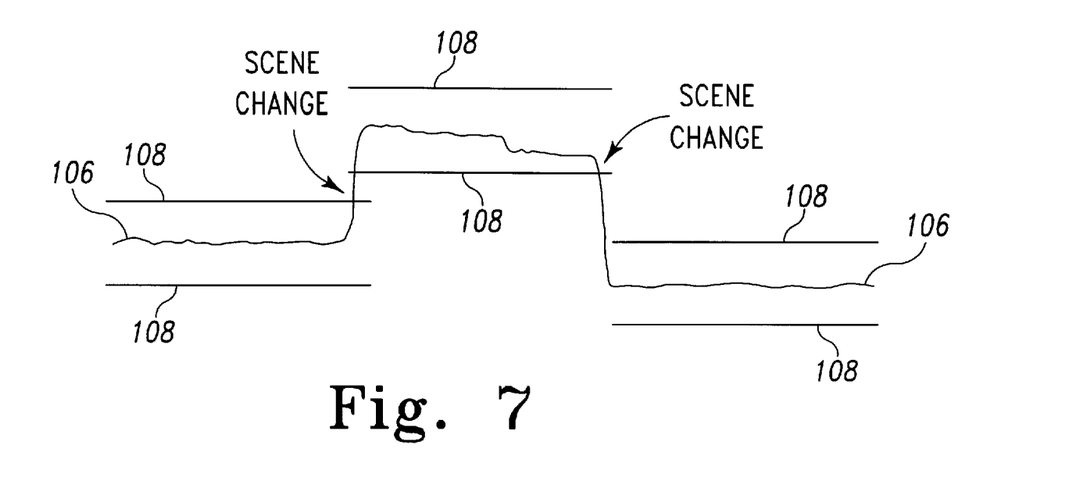
FIG. 7 is a graph of composite pixel color values vs. frame number for a series of video data frames, illustrating the sensitivity limits of the present invention.

Step 104 also allows the user to determine the sensitivity of the software in detecting scene changes. FIG. 7 illustrates a plot of the composite color values 106 for several sequential frames plotted versus time. The sensitivity limits for the software are illustrated at 108. Any time the composite color value for one frame changes by more than the sensitivity limit 108 from the preceding frame, the software recognizes that a potential scene change has occurred between the two frames. By adjusting the size of the limits 108, the scene detection process can be made more or less sensitive. A high limit (more sensitive) may be appropriate if scene changes occur slowly in the digital video stream or if the color tends to be uniform from one scene to the next. A low limit (less sensitive) may be appropriate if there are many changes in the digital video stream that are not pure scene changes.

Figure 8:
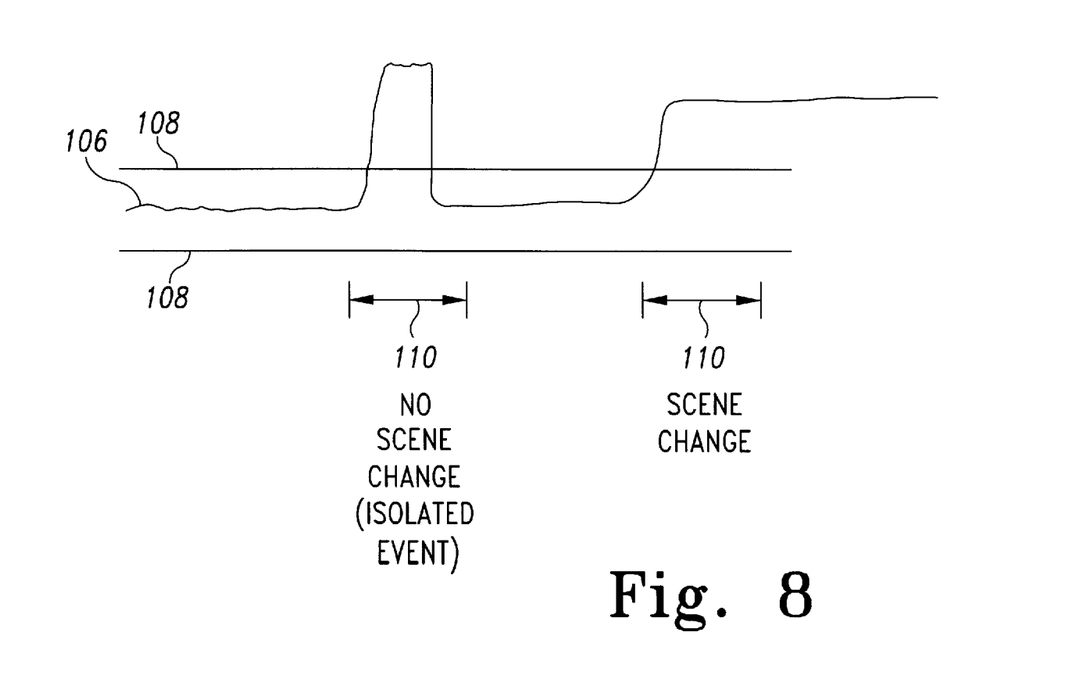
FIG. 8 is a graph of composite pixel color values vs. frame number for a series of video data frames, illustrating the threshold window of the present invention.

The user may also select at step 104 the threshold value for declaring the scene change. The crossing of a sensitivity boundary by the composite color data 106 will not necessarily result in a scene change being detected by the software program. The threshold command may be used to examine a predetermined number of frames following the frame which exceeded the sensitivity limits. The threshold window is indicated at 110 in FIG. 8. For example, after the data 106 exceeds one of the sensitivity boundaries 108 (a potential scene change), the scene detection program may compare the next ten frames to the initial frame (the frame prior to the frame which crossed the sensitivity boundary 108) in order to determine if the scene has really changed. If most of the frames within the threshold window do not exceed the sensitivity boundary 108 when compared to this initial frame, then there has likely not been a scene change and an isolated event in the video data stream caused the composite color value data 106 to exceed the sensitivity limit 108 momentarily (e.g. a flashbulb went off in the video, but the scene did not change). If, however, most of the frames within the threshold window 110 exceed the sensitivity limits 108 when compared to the initial frame, then there is likely a valid scene change and the scene boundary is determined to be between the initial frame and the first frame which exceeded the sensitivity limits 108. It will be appreciated by those skilled in the art that adjustment of the sensitivity limits and the threshold window give the user great control over what conditions will be recognized as a scene change.

Likewise, the scene detection device may be instructed to ignore certain colors when performing the scene detection process. For example, a video data stream might include several video segments, each separated by several black frames. The scene detection device might be instructed to ignore the black frames so that they are not registered as scenes. Furthermore, the scene detection device can be instructed to include only pixels having a certain color range. This can be useful in scientific applications such as monitoring of algae or bacteria growth, where the subject of interest has a characteristic color.

Finally, step 104 allows the user to determine whether or not the software program will grab a frame associated with each scene for inclusion in the memory file. This allows the scene detection program to save only the text and data associated with the scene changes, but not any images, in order to save memory. This may be useful when operating the software in an environment where limited memory is available (e.g. on a laptop computer), or in the ATM security camera example, where a complete videotape will be stored and the individual scene frames are not required to be stored separately.

Returning now to FIGS. 6A–B, the process continues at step 112 in which the user enables the scene detection module. The software program instructs the operating system to display the input video within a predetermined window area on the screen. The scene detection software program will now begin to analyze successive frames of video data in order to look for changes significant enough to declare as scene changes. Unlike prior art devices, the process of the present invention does not retrieve the video data directly from a hardware digitizing card. Intstead, the software program retrieves a frame of video data from the operating system. Because the video data is being displayed in a portion of the screen display on the monitor 14, the CPU 12 has pixel color information for each pixel in the video display. The software program of the present invention therefore requests that the operating system transmit the pixel color information for the pixels within the window where the video is being displayed to the software program. Under the WINDOWS operating system, the software may request a data array corresponding to the defined video window display area by using the "windows screen device context" command. This results in the operating system returning an array of data consisting of pixel color values corresponding to each pixel within the video display window on the monitor 14. Each pixel will have a color value between 0 and 255 (when using 256 color resolution). If the software is requesting data for the first frame in a new scene, then it also requests timecode data associated with this frame.

The program then adds the pixel values in the video frame array at step 114 in order to determine the total composite color value for the frame. There are many ways that step 114 may be accomplished. The program may simply add each of the pixel color values in the entire array in order to arrive at a single composite number, it may divide the data array into (for example) twelve quadrants and obtain the total composite pixel color value for each quadrant, or use some other method of arriving at a numerical measurement of the information content of the frame. Each succeeding frame will be totaled in the same manner, and these totals will be compared from frame to frame in order to detect scene changes.

At step 116, the total composite pixel color data from the current frame is compared to that for the previous frame in order to see if the difference exceeds the sensitivity limits set by the user. If the sensitivity limits have been exceeded, then all of the frames within the predefined threshold window are similarly examined at step 118 in order to determine if there is a scene change. If the test of either step 116 or 118 is not met, then the software determines that no scene change has occurred at step 120 and the process returns to step 112 in order to retrieve the next frame in the digital video stream.

If, on the other hand, the test of steps 116 and 1.18 have been met, then the software program determines that a scene change has occurred at step 122. If the initial parameters defined by the user indicate that frame information is to be saved for each scene, then the software program will save the video data for the current frame. Alternatively, the program may request a high quality representation of the video frame by requesting a copy of the frame directly from VIDEO FOR WINDOWS, which returns a higher quality frame image than that received from the WINDOWS screen display. The timecode for the frame is retrieved and stored in random access memory (RAM). The frame that has been grabbed by the software program will be stored in a temporary location on the hard drive if the user has selected the option of storing the first frame for each scene. If, however, the user has opted to store only the most representative frame for each scene, then the current frame is still stored in a temporary location on the hard drive but the software continues to compare this frame to subsequent frames in the new scene in order to determine which frame is the most representative. Each time a new frame is found which is more representative (i.e. chances less from its preceding frame), this new most representative frame is written over the old frame data at the temporary storage location on the hard drive. In parallel to this process for looking for the most representative frame of the current scene, the software program continues to look for the next scene change beginning at step 112.

Step 124 determines if the end of the digital video data stream has been reached and, if so, the scene detection process is stopped. If not, then the process returns to step 112. After the scene detection process has stopped, step 126 prompts the user to determine if the scene detection data should be saved, if it should be cleared (delete all scene detection data, however, do not clear the setup choices made at step 104), or to cancel (return to step 100).

If the user chooses to store the scene detection information at step 128 then the process continues at step 132 where the software creates a single temporary file containing timecodes, video frames and template information, including tile calculated duration of each scene from the timecode in and timecode out information. At this point, the user may perform several optional operations at step 134 prior to permanently saving the data. For example, the user may add text to each frame or scene. The user may view any scene (video clip). The user may also edit out any scenes. Such editing may be done in different ways. For example, a scene may be edited out, leaving a hole, such that there is gap in the timecodes from the end of one scene and tire beginning of the next. Alternatively, a scene may be edited out and the adjacent scenes may be merged by modifying the timecodes appropriately. The user may also review any scene and manually select a representative frame to replace the representative frame selected by the software program. Also, the user may instruct the software to automatically replace the frame associated with each frame with the first frame in the scene, the middle frame in the scene, etc. in reviewing the detected scenes the user may determine that a portion of the video data stream lends itself to the use of different sensitivity and threshold settings than the remainder of the video data stream. The options at step 134 will allow the user to delete a section of the detected scenes and to rerun that portion of the video data using new sensitivity and/or threshold settings. The options of step 134 will also allow the user to reorder the list of scenes and then replay the video data in that sequence. Those having ordinary skill in the art will recognize that many other options may be offered to the user once the scene detection process has been completed. Once the user has completed the options that he desires, the file is saved at step 136 in a permanent format.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, if the scene detection device of the present invention is operating upon video data that is already stored in memory, then it may be redundant for the scene detection device to store frame information in memory. Instead, the scene detection device could simply store pointers in memory which indicate where the particular file may be found in the video data file. Additionally, because the process of the present invention comprises strictly numerical processing, it is possible to operate the scene detection process in faster than real time in order to speed up the process of the detecting scene changes. This can be a significant benefit if there are large amounts of video to be analyzed (e.g. when creating indexes for a video library). This can also be important for time-critical video, such as news video which must be processed prior to airing for broadcast.

What is claimed is:

1. A method for detecting scene changes in a digital video data stream, comprising the steps of:
   a) inputting the digital video data stream to a computer;
   b) providing an operating system executed by the computer, said operating system including a software display control program operative to control display of all information displayed upon a monitor coupled to the computer;
   c) displaying the digital video data stream upon the monitor, said displaying performed under control of said software display control program;

d) providing a scene detection software program executed by the computer, wherein said scene detection software program and said software display control program are separate programs, said scene detection software program performing the following steps:
   e) retrieving color values for each first pixel in a first frame of the digital video data stream from said software display control program;
   f) adding the first pixel color values together in order to generate a first composite color value;
   g) retrieving color values for each second pixel in a second frame of the digital video data stream from said software display control program;
   h) adding the second pixel color values together in order to generate a second composite color value; and
   i) detecting a scene change if the second composite color value differs from the first composite color value by more than a predetermined amount.

2. The method of claim 1, wherein step (a) comprises inputting an analog video signal to an analog-to-digital converter.

3. A method for detecting scene changes in a digital video data stream, comprising the steps of:
   a) inputting the digital video data stream to a computer;
   b) providing an operating system executed by the computer, said operating system including a software display control program operative to control display of all information displayed upon a monitor coupled to the computer;
   c) displaying the digital video data stream upon the monitor, said displaying performed under control of said software display control program;
   d) providing a scene detection software program executed by the computer, wherein said scene detection software program and said software display control program are separate programs, said scene detection software program performing the following steps:
      e) retrieving color values for each first pixel in a first frame of the digital video data stream from said software display control program;
      f) adding the first pixel color values together in order to generate a first composite color value;
      g) retrieving color values for each second pixel in a second frame of the digital video data stream from said software display control program;
      h) adding the second pixel color values together in order to generate a second composite color value;
      i) detecting a scene change if the second composite color value differs from the first composite color value by more than a predetermined amount;
      j) recording an index representative of where the scene change occurred in the digital video data stream; and
      k) recording a representative frame of a scene bounded by the scene change.

4. A method for detecting scene changes in a digital video data stream, comprising the steps of:
   a) inputting the digital video data stream to a computer;
   b) providing an operating system executed by the computer, said operating system including a software display control program operative to control display of all information displayed upon a monitor coupled to the computer;
   c) displaying the digital video data stream upon the monitor, said displaying performed under control of said software display control program;
   d) providing a scene detection software program executed by the computer, wherein said scene detection software program and said software display control program are separate programs, said scene detection software program performing the following steps:
      e) retrieving color values for each first pixel in a first frame of the digital video data stream from said software display control program;
      f) retrieving color values for each second pixel in a second frame of the digital video data stream from said software display control program;
      g) comparing the second pixel color values to the first pixel color values in order to determine a pixel color value difference; and
      h) detecting a scene change if the pixel color value difference is greater than a predetermined amount.

5. The method of claim 4, wherein step (g) comprises:
   g.1) adding the first pixel color values together in order to generate a first composite color value;
   g.2) adding the second pixel color values together in order to generate a second composite color value; and
   g.3) determining the pixel color value difference by subtracting the first and second composite color values.

6. The method of claim 4, further comprising the step of:
   i) storing a timecode in, a timecode out, and a first frame of the detected scene.

7. The method of claim 4, further comprising the step of:
   i) storing a timecode in, a timecode out, and a first frame of the detected scene.

8. A method for detecting scene changes in a digital video data stream, comprising the steps of:
   a) inputting the digital video data stream to a computer;
   b) providing an operating system executed by the computer, said operating system including a software display control program operative to control display of all information displayed upon a monitor coupled to the computer;
   c) displaying the digital video data stream upon the monitor, said displaying performed under control of said software display control program;
   d) providing a scene detection software program executed by the computer, wherein said scene detection software program and said software display control program are separate programs, said scene detection software program performing the following steps:
      e) retrieving color values for each first pixel in a first frame of the digital video data stream from said software display control program;
      f) retrieving color values for each second pixel in a second frame of the digital video data stream from said software display control program;
      g) comparing the second pixel color values to the first pixel color values in order to determine a pixel color value difference;
      h) detecting a scene change if the pixel color value difference is greater than a predetermined amount;
      i) recording an index representative of where the scene change occurred in the digital video data stream; and
      j) recording a representative frame of a scene bounded by the scene change.

* * * * *

UNITED STATES PATENT AND TRADEMARK OFFICE
CERTIFICATE OF CORRECTION

PATENT NO. : 6,014,183
DATED : January 11, 2000
INVENTOR(S) : Toan Q. Hoang

It is certified that error appears in the above-identified patent and that said Letters Patent is hereby corrected as shown below:

Title page,
Following the inventor's name, please change "Indianapolis" to -- Fishers --.

Item [57], ABSTRACT, following "video data of interest.", please insert -- This approach ensures that the present invention operates completely independently of the video source and the method by which the video is input to the computer. Consequently, the present invention will work with any hardware configuration which allows video to be displayed upon the monitor of the computer. --

Column 4,
Line 4, please change "ill" to -- in --.
Line 23, please change "play" to -- may --.
Line 25, please delete the new paragraph, and continue on with the same paragraph.

Column 5,
Line 61, please change "would(" to -- would --.

Column 7,
Line 34, please insert a period between "stored" and "For".

Column 9,
Line 32, please change "1.18" to -- 118 --.

Column 10,
Line 20, following "etc.", please begin a new paragraph and change "in" to -- In --.

Signed and Sealed this

Twenty-fifth Day of December, 2001

Attest:

*Attesting Officer*

JAMES E. ROGAN
*Director of the United States Patent and Trademark Office*